Nov. 6, 1928.  1,690,477
D. R. COLLINS
DISPLAY DEVICE
Filed March 25, 1927
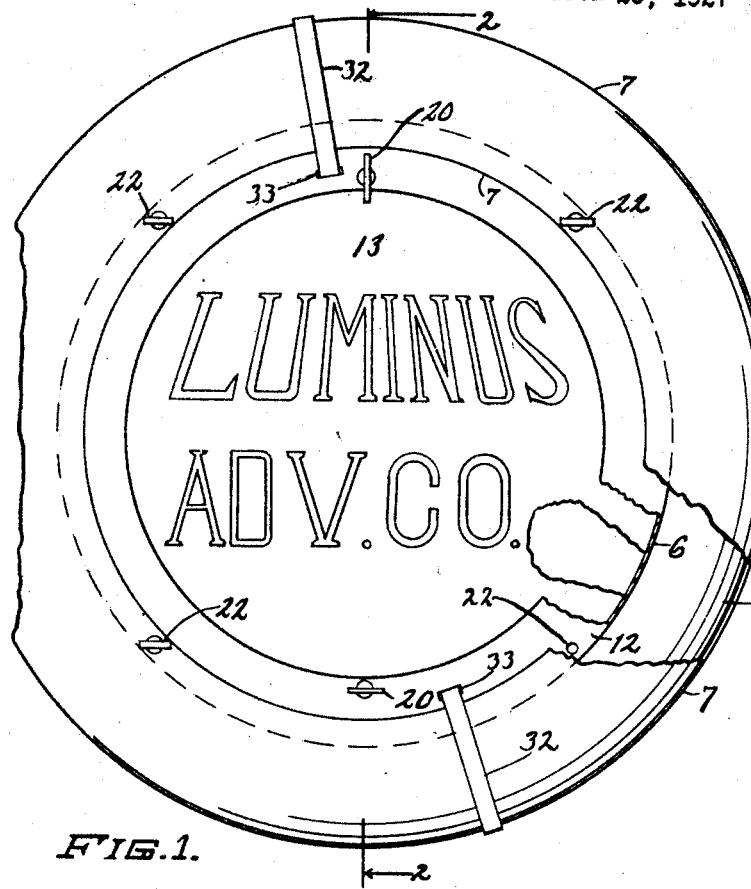
FIG. 1.
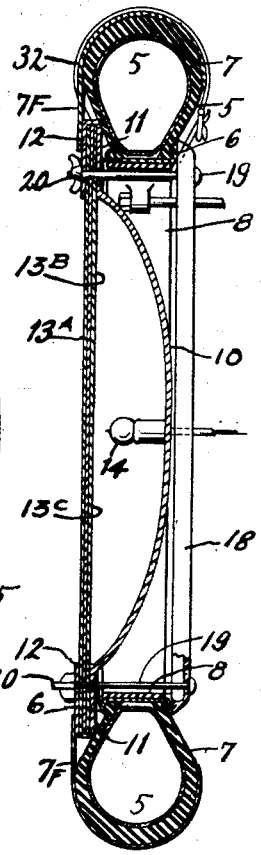
FIG. 2.
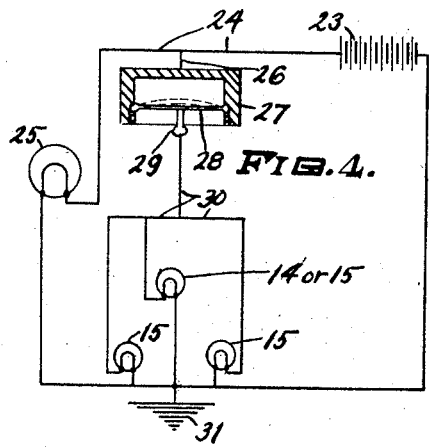
FIG. 4.
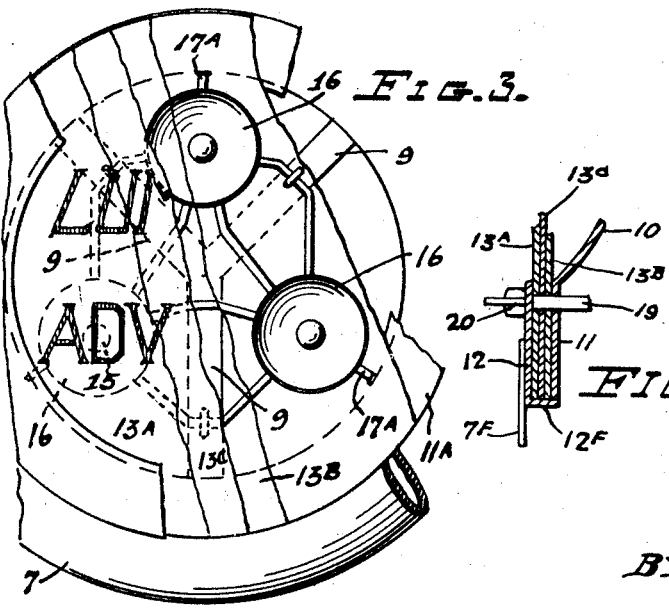
FIG. 3.
FIG. 5.
INVENTOR:
David R. Collins
BY David E. Carlsen
ATTORNEY.

Patented Nov. 6, 1928.

1,690,477

UNITED STATES PATENT OFFICE.

DAVID R. COLLINS, OF MINNEAPOLIS, MINNESOTA, ASSIGNOR OF ONE-HALF TO RAY E. BARTHOLDI, OF CHICAGO, ILLINOIS.

DISPLAY DEVICE.

Application filed March 25, 1927. Serial No. 178,262.

My invention relates to an illuminable display device and the object is to provide a simple, inexpensive and efficient device of said kind which is particularly adaptable to be mounted concentric of the spare tire carrier on the rear end or other parts of a motor vehicle, and contains an exposed area for displaying any suitable lettering, figures or designs. Further objects will be revealed in the following description, reference being had to the accompanying drawing, in which,—

Fig. 1 is a face view of my device in operative position and retained in a vertical plane between a tire and a tire cover thereon.

Fig. 2 is a cross sectional view as on line 2—2 in Fig. 1.

Fig. 3 is a face view partly in section, of Fig. 1 modified.

Fig. 4 is an electric wiring diagram including a flasher for intermittent illumination of the display device, Fig. 5 is an enlarged sectional detail of the lower left part of Fig. 2.

Referring to the drawing by reference numerals, 5 designates an automobile tire of the pneumatic type and mounted on the usual metallic tire rim 6. 7 represents a tire cover of ring shape and of such size as to snugly fit the tire and usually having the radially inwardly directed flap or extension 7$^F$, normally amply protecting a tire being carried on the spare tire carrier of a car. On some cars said carrier comprises a fixed ring 8 to which the tire rim 6 is secured by the regular rim lugs and bolts, not shown, and other tire carriers comprise an upright Y-shaped bracket 9 with lug and bolt means (not shown), to suitably engage the tire rim at three points.

My device comprises a circular dished reflector element 10 of suitable material shown as metal in Fig. 2, and in Fig. 5 designates a suitable fabric such as oil-cloth having a glazed or bright surface. This member 10 has an integral outer rim 11 and 12 is a ring of sheet metal corresponding in size to rim 11 and preferably having a perimetral inwardly directed flange 11$^F$ (shown in Fig. 5) to hold rim 11 concentric within it.

13 is a circular display plate preferably consisting of an outer sheet of clear celluloid 13$^A$, an inner sheet 13$^B$ of the same material if so desired, and between said two sheets a plate 13$^C$ of preferably translucent material (see lower part of Fig. 2) on which is painted or otherwise applied lettering, pictures or figures of any kind. The main area of this latter display plate may be dark and the lettering or other subjects are clear or vice versa.

14 in Fig. 2 shows an electric bulb suitably fixed centrally of the reflector 10, to illuminate the display plate. 15 in Fig. 3, illustrates three electric bulbs removably secured in socket plates 16 suitably fixed in the fabric bottom 10 and in circularly spaced relation to each other and one between each pair of a three armed tire holding adjacent arms, of bracket 9. Said plates may further be held inwardly of the plane of arms 9 by suitable wire framing 17 which wire frame may also include radial arms 17$^A$ extended to a plate ring 11$^A$ corresponding to ring 11 in Fig. 1. It will be assumed of course that the oil cloth or other fabric 10 used is stretched on said frame and comprises the reflector in this type of the device, the object of getting the three lights 15 set in, being to get them far enough from the display surface to insure proper lighting of the display plate, because the tire rack 9 is usually too close to the outer plane of a tire to insure proper lighting of my device. In this view (Fig. 3) is distinctly shown the inner celluloid sheet 13$^B$, plate 13$^C$ and the outer celluloid sheet 13$^A$.

In Fig. 2, 18 is a bar extended diametrically across and bearing with its end parts against the tire rim 6 at its inner side and being held fixed thus by two bolts 19 extending outwardly through registering apertures in rim 11—12 of my device and the outer projections of said bolts each provided with a wing nut 20. Assuming that tire 5 is inflated, the inner side of ring 11—12 will thus be clamped against the outer adjacent part of the tire when the wing nuts are adjusted.

When so desired, my device may be held concentric of the tire by a number of circularly arranged thumb-screws 22 passed through registering eyelets or apertures in the tire cover 7. It is obvious too that where my device is inserted between the tire and its cover and where said cover is of substantial material and is a tight fit on the tire, my device may be frictionally retained between them without any of the holding means above described.

In the wiring diagram, Fig. 4, 23 represents a source of electric current in any vehicle to which my device is attached, 24 is a circuit wire from 23 to the usual tail light 25 of an automobile. 26 is a wire tapping wire 24 and leading to a circuit breaker or so-called flasher illustrated as a metal socket 27 having an expansion element 28 which is heated and expanded by the current and breaking circuit through a fixed pin 29 connected by wire 30 to the lamps 15 of Fig. 3 or to lamp 14, (Fig. 2), current being grounded at 31. There may, of course, be various other kinds of flasher devices equally adaptable for the purpose and well known in the electrical field.

32 in Figs. 1 and 2 are a pair of straps each arranged to pass through a slot 33 in the flange 11—12 of my device at diametrically opposite parts thereof and be passed around the tire 5 and under tire ring 8 and may be adjusted at the buckle 32$^B$. Thus provision is made for securing my display device in place when there is no tire cover 7.

I claim:

1. An electric display device comprising a circular concaved reflector, a ring disc formed integrally at and extending from the perimeter of said reflector, lighting means fixed in said reflector, a clamp ring corresponding to the ring extension of the reflector, an illuminable display element clamped between said two rings in spaced relation to said lighting means, said display element comprising an outer transparent disc, a like inner disc, a display plate between said transparent discs and carrying illuminable areas of suitable colors visible in daytime and illuminable in the dark.

2. The structure specified in claim 1 in which said circular ring parts are adapted to be insertible between a tire and a tire cover with said display area exposed concentrically of the said cover, and further means for holding the display device comprising a number of circularly arranged bolts extended outwardly through the clamp rings, thence through registering apertures provided in said tire cover and a suitable nut threaded on the outer end of each said bolt externally of the tire cover.

3. An electrically illuminable display device adapted to be detachably retained concentrically of a circular tire holding rack including a fixed upright ring having means for retaining a tire rim and tire thereon, said display device comprising a display plate, outer and inner metal clamping rings and means arranged in said rings to clamp the display plate between them, the inner of said rings formed integral with a concaved reflector, said rings provided with a pair of diametrically opposite apertures, a bar with a pair of apertures registering with said first mentioned apertures, said bar arranged diametrically across the said fixed tire ring, a bolt for each aperture in said bar and extended toward and through a corresponding aperture in the ring of the display device at the opposite side of said fixed tire ring and a nut threaded on the latter end of each said bolt to draw the ring of the display device toward said fixed tire ring and at the opposite side of said latter ring, each said bolt and the apertures therefor arranged close to the inner side of said fixed tire ring.

4. The structure specified in claim 1, in which said reflector comprises a woven fabric with a glossy surface presented toward the display plate, a skeleton frame fixed to said reflector ring and arranged to hold said fabric in taut spaced relation to said display plate, a plurality of light sockets fixed in said frame in predetermined circularly spaced relation to each other and simultaneously in corresponding spaced relation to the said display plate.

5. The structure specified in claim 1, in which said lighting means comprises a number of electric light bulbs and a source of electric current in circuit.

6. The structure specified in claim 1, in which said lighting means comprises a number of electric light bulbs and a source of electric current in circuit and an automatic circuit opener and closer in said circuit for successively darkening and illuminating said display plate.

In testimony whereof I affix my signature.

DAVID R. COLLINS.